US009812715B2

United States Patent
Whiton et al.

(10) Patent No.: US 9,812,715 B2
(45) Date of Patent: Nov. 7, 2017

(54) FUEL CELL PLATE FLOW FIELD

(71) Applicant: Audi AG, Ingolstadt (DE)

(72) Inventors: John H. Whiton, South Windsor, CT (US); David A. Niezelski, Manchester, CT (US); Robert A. Love, Bloomfield, CT (US); Edward Gordon Schaub, Windsor, CT (US)

(73) Assignee: Audi AG, Ingolstadt (DE)

( * ) Notice: Subject to any disclaimer, the term of this patent is extended or adjusted under 35 U.S.C. 154(b) by 61 days.

(21) Appl. No.: 14/511,104

(22) Filed: Oct. 9, 2014

(65) Prior Publication Data
US 2015/0024303 A1 Jan. 22, 2015

Related U.S. Application Data

(62) Division of application No. 13/127,990, filed as application No. PCT/US2008/083718 on Nov. 17, 2008, now abandoned.

(51) Int. Cl.
*H01M 8/02* (2016.01)
*H01M 8/026* (2016.01)
*H01M 8/0258* (2016.01)
*H01M 8/04089* (2016.01)
H01M 8/1018 (2016.01)

(52) U.S. Cl.
CPC ......... *H01M 8/026* (2013.01); *H01M 8/0258* (2013.01); *H01M 8/04089* (2013.01); *H01M 2008/1095* (2013.01); *Y02P 70/56* (2015.11)

(58) Field of Classification Search
CPC .. H01M 8/0258; H01M 8/026; H01M 8/0263; H01M 8/0265; H01M 8/0254; H01M 8/04089; H01M 2008/1095; Y02P 70/56
See application file for complete search history.

(56) References Cited

U.S. PATENT DOCUMENTS

| 4,963,442 A | 10/1990 | Marianowski et al. |
| 5,514,487 A | 5/1996 | Washington et al. |
| 5,686,199 A | 11/1997 | Cavalca et al. |
| 5,981,098 A | 11/1999 | Vitale |
| 6,159,629 A | 12/2000 | Gibb et al. |

(Continued)

FOREIGN PATENT DOCUMENTS

| EP | 1 264 360 | 12/2002 |
| JP | 11-016591 | 1/1999 |

(Continued)

OTHER PUBLICATIONS

International Search Report on Patentability for International application No. PCT/US2008/083718 dated May 26, 2011.

(Continued)

*Primary Examiner* — Lisa S Park
(74) *Attorney, Agent, or Firm* — Seed IP Law Group LLP

(57) ABSTRACT

A fuel cell plate is provided that includes a flow field having a plurality of channels each with an inlet end, and a header in fluid communication with the inlet ends. The header has at least one restricted flow region in which fluid flow is restricted to the inlet ends of a set of channels of the flow field and at least some of the plurality of channels include a pressure drop feature that is configured to increase fluid flow to the set of channels.

21 Claims, 2 Drawing Sheets

(56) References Cited

U.S. PATENT DOCUMENTS

| | | | |
|---|---|---|---|
| 6,358,642 B1 | 3/2002 | Griffith et al. | |
| 6,472,095 B2 | 10/2002 | Margiott | |
| 6,528,196 B1 | 3/2003 | Fujii et al. | |
| 6,544,681 B2 | 4/2003 | McLean et al. | |
| 6,586,128 B1 * | 7/2003 | Johnson et al. | 429/444 |
| 6,632,556 B2 | 10/2003 | Guthrie et al. | |
| 6,841,287 B2 | 1/2005 | Farkash | |
| 6,844,101 B2 | 1/2005 | Lee et al. | |
| 6,878,477 B2 | 4/2005 | Frank et al. | |
| 6,893,759 B2 | 5/2005 | Ooma et al. | |
| 6,924,056 B2 | 8/2005 | Whiton et al. | |
| 7,052,796 B2 | 5/2006 | Sabin et al. | |
| 7,067,213 B2 | 6/2006 | Boff et al. | |
| 7,838,139 B2 * | 11/2010 | Turpin | H01M 4/8605 429/417 |
| 2002/0086200 A1 * | 7/2002 | Margiott | 429/38 |
| 2005/0118489 A1 | 6/2005 | Frederiksen | |
| 2009/0208803 A1 * | 8/2009 | Farrington | H01M 8/0258 429/434 |

FOREIGN PATENT DOCUMENTS

| | | |
|---|---|---|
| JP | 2007-005237 | 1/2007 |
| JP | 2007-220356 | 8/2007 |
| JP | 2008-171608 | 7/2008 |
| KR | 20030060668 | 7/2003 |
| WO | 02/059988 | 8/2002 |
| WO | 02/065566 | 8/2002 |

OTHER PUBLICATIONS

International Search Report and Written Opinion of the International Searching Authority for International application No. PCT/US2008/083718 dated Aug. 17, 2009.

* cited by examiner

FUEL CELL PLATE FLOW FIELD

BACKGROUND

Technical Field

This disclosure relates to a fuel cell plate flow field configuration.

Description of the Related Art

A fuel cell includes an anode and a cathode arranged on either side of a membrane electrode assembly. The anode and the cathode are provided by a plate, which includes a flow field. The anode plate flow field delivers fuel to the membrane electrode assembly, and the cathode plate flow field delivers a reactant to the membrane electrode assembly.

The flow fields are provided by multiple channels that are provided fluid from an inlet manifold. The channels have been arranged in a variety of configurations depending upon a variety of factors, such as packaging constraints. Typically, it is desirable to provide a manifold that is wider than inlets to the channels to ensure a generally even distribution of flow across the channels. Occasionally, it is not possible to supply each of the channel inlets with unobstructed flow from the inlet manifold. As a result, some of the channels receive a somewhat limited flow, which results in an uneven distribution of flow across the flow field. Uneven flow distribution can create temperature gradients across the plate and reduce the efficiency of the chemical reactions within the fuel cell. In the case of anode flow fields, insufficient hydrogen at a location can create carbon corrosion of the anode plates. In the case of cathode flow fields, insufficient oxygen at a location can cause high temperatures and cell voltage dropoff.

What is needed is a fuel cell plate having a flow field with a generally even flow distribution in configurations where it is not possible to supply an uninhibited flow to at least some of the channels.

BRIEF SUMMARY

A method of manufacturing a fuel cell plate flow field is disclosed in which a generally even flow distribution across the flow field is provided. The method includes providing an inlet manifold in fluid communication with the flow field. The flow field includes multiple channels for which some of the channels receive restricted flow from the inlet manifold as compared to other channels. A relative pressure drop between the channels is altered with a pressure drop feature to encourage fluid flow from the inlet manifold to the channels with restricted flow, which results in a generally even flow distribution across the flow field.

In one example, first and second sets of channels are arranged in alternating relationship. Inlet passages from the inlet manifold are misaligned with the first channels to encourage fluid flow from across first set of channels in a balanced manner. In another example, unobstructed channels include a shallow channel portion to increase the pressure drop along those channels. Cross-cuts can be used from the unobstructed channels to the obstructed channels to reduce the pressure drop along the obstructed channels.

What is needed is a fuel cell plate having a flow field with a generally even flow distribution in configurations where it is not possible to supply an uninhibited flow to at least some of the channels.

DETAILED DESCRIPTION

Figure 1:
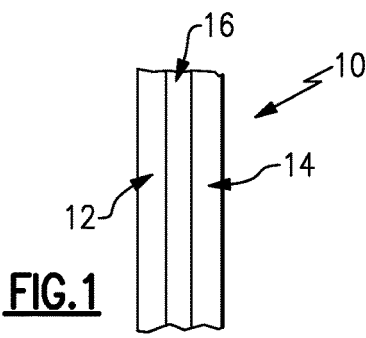
FIG. 1 is a highly schematic view of a fuel cell.

A fuel cell 10 is shown in a highly schematic fashion in FIG. 1. The fuel cell 10 includes a membrane electrode assembly 16 arranged between an anode 12 and a cathode 14. The membrane electrode assembly 16 comprises a proton exchange membrane arranged between gas diffusion layers, for example. The anode 12 and the cathode 14 respectively provide fuel and reactant flow fields provided by channels in a solid or porous plate. The flow fields are fluidly connected to flow field inlets and exhausts using either internal or external manifolds that are in fluid communication with their respective fluid flow component.

Figure 4:
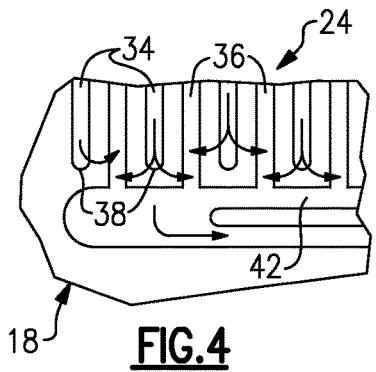
FIG. 4 is an enlarged view of another portion of the plate shown in FIG. 2.
Figure 2:
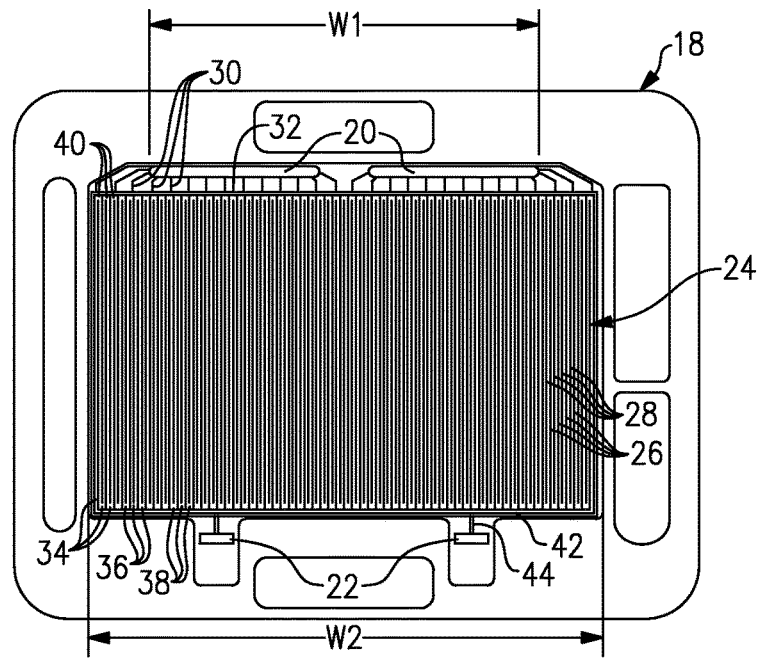
FIG. 2 is a plan view of an example fuel cell plate having a flow field.
Figure 3:
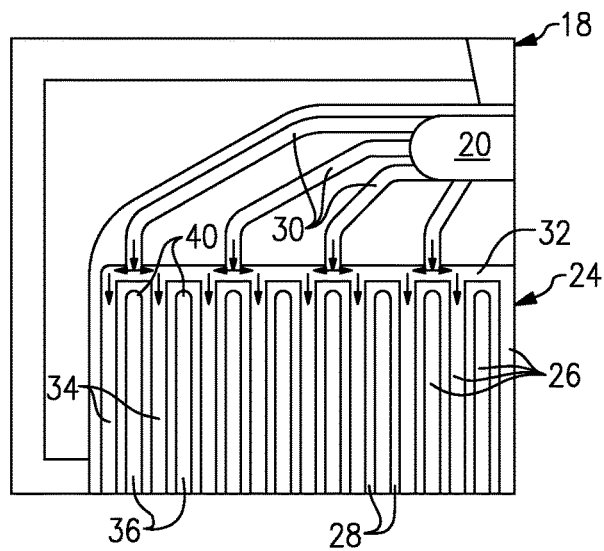
FIG. 3 is an enlarged view of a portion of the plate shown in FIG. 2.

A plate 18 is illustrated in FIGS. 2-4 having internal inlet and exhaust manifolds 20, 22. A flow field 24 is fluidly interconnected between the inlet and exhaust manifolds 20, 22. In the example, the inlet and exhaust manifolds are arranged on opposite sides of the plate 18. Parallel channels 26 arranged between risers 28 provide the flow field 24. In the example, the channels 26 extend a length L and are parallel with one another along the length without any significant bends. That is, there are no right angle turns and a given channel does not double back on itself as is typical with some flow fields. The flow field 24 has a width W2 that is greater than the width of the inlet manifold 20. This configuration presents a challenge of evenly distributing fluid across the flow field 24. Specifically, the channels outboard of the inlet manifold 20 are typically starved of fluid, resulting in an uneven chemical reaction at the proton exchange membrane and hot-cold spots on the plate 18 or carbon corrosion on the anode side.

In one example, the channels 26 are divided into first and second sets of channels 34, 36 arranged in alternating relationship with one another to provide an interdigitated flow field. The first set of channels 34 are fluidly interconnected by a lateral inlet passage 32, extending a width W2, that is supplied fluid from the inlet manifold 20 through discrete, spaced apart inlet passages 30. In the example, the inlet passages 30 are generally evenly spaced laterally from one another and misaligned with the channels in the first set of channels 34. This misalignment encourages even fluid distribution across the first set of channels 34. Each channel of the first set of channels 34 extends from the lateral inlet passage 32 to a first terminal end 38, best shown in FIG. 4.

Each channel of the second set of channels 36 extend from a second terminal end 40, which is arranged near the lateral inlet passage 32 (best shown in FIG. 3), to a lateral exhaust passage 42 that fluidly interconnects the second set of channels 36 with one another. In the example, there is a pair of lateral exhaust passages 42 interconnected to and parallel with one another, extending the width W2, as best shown in FIG. 4. The first terminal ends 38 are arranged near the lateral exhaust passages 42. Discrete exhaust passages 44 fluidly connect the lateral exhaust passages 42 to the exhaust manifold 22.

In operation, fluid is supplied to the first set of channels 34 by the inlet manifold 20 via the inlet passages 30. Since the first set of channels 34 is dead-ended at the first terminal ends 38, fluid will flow into the gas diffusion layer of the membrane electrode assembly 16, for example, and into the second set of channels 36. This interdigitated arrangement of channels provides a pressure drop feature between the first and second sets of channels 34, 36 that evenly distributes flow across the flow field 24. Fluid from the gas diffusion layer is provided to the proton exchange membrane for chemical reaction. From the second set of channels 36, fluid is returned to the exhaust manifold 22.

Figure 5:
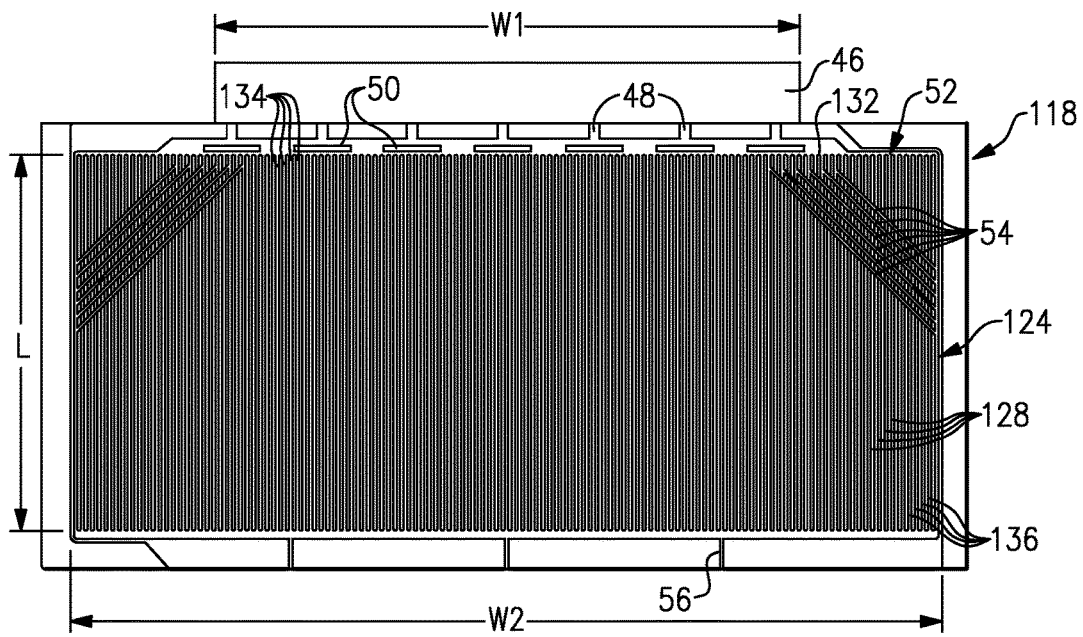
FIG. 5 is a plan view of another example fuel cell plate.

Another plate 118, which has an external inlet manifold 46, is shown in FIG. 5. Fluid is supplied to a header within the plate 118, which provides the lateral inlet passage 132, through inlet passages 48. Flow from the inlet passages 48 encounters baffles 50 that distribute the flow within the header. The flow field 124 has a width W2 that is wider than the width of the manifold 46, W1. Flow to the first set of channels 134 is generally unobstructed. In the configuration shown in FIG. 5, the flow becomes choked at the extremities within the header at a restricted flow region 52 such that flow to the second set of channels 136 is obstructed. Risers 128 separate the first and second sets of channels 134, 136.

Obstructed flow to the second set of channels 136 would create a pressure drop across a length L of the second set of channels 136. To counter this pressure drop and provide an even flow distribution across the flow field 124, cross-cuts or cross passages 54 are arranged from some of the first set of channels 134 near the header and extending at an angle and away from the header into the second set of channels 136 beneath the restricted flow region 52. The cross passages 54 can also be arranged perpendicular to the channels. As a result, flow will be evenly distributed across the flow field 124 from the inlet manifold 46 to the exhaust manifold through passages 56.

Figure 6:
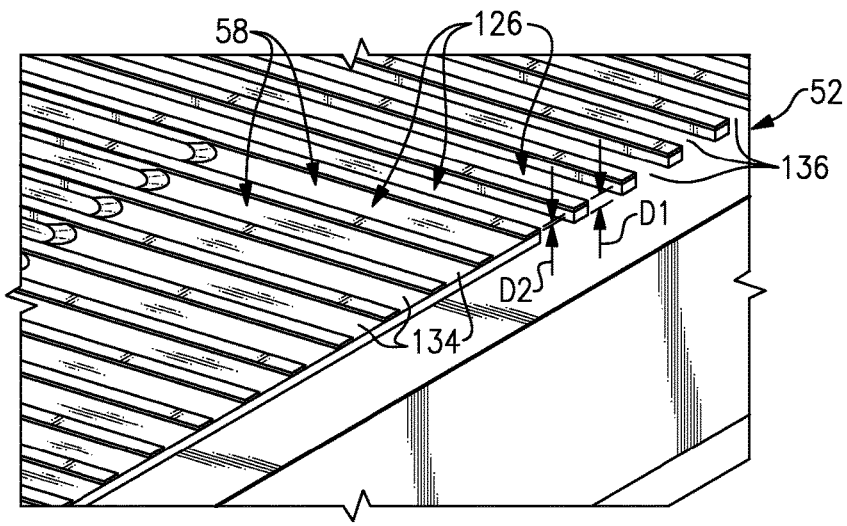
FIG. 6 is an enlarged perspective view of a portion of the fuel cell plate shown in FIG. 5.

Referring to FIG. 6, another pressure drop feature is shown that can be used instead of or in addition to the cross passages 54 in the plate 118. The first set of channels 134, which would otherwise be unobstructed, include shallow channel portions 58 providing a smaller cross-sectional area that create a pressure drop across the length L of the first set of channels 134. The second set of channels 136 include a channel depth D1 that is greater than the channel depth D2 associated with the shallow channel portion 58, which is arranged near the header. The first set of channels 134 may transition from the depth D2 at the shallow channel portion 58 to the depth D1 further downstream. The length of the shallow channel portion 58 and its depth are selected to achieve a desired pressure drop that results in an even flow distribution across the flow field 124. The term "depth" is also intended to include width.

Although example embodiments have been disclosed, one of ordinary skill in this art would recognize that certain modifications would come within the scope of the claims. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fuel cell comprising:
a structure including a flow field having a first plurality of channels at a first edge portion of the flow field, a second plurality of channels at a second edge portion of the flow field opposite to the first edge portion, and a third plurality of channels between the first plurality of channels and the second plurality of channels, each of the channels having an inlet end open to a header in fluid communication with the inlet ends, the header including a first restricted flow region configured to decrease fluid flow to the inlet ends of the first plurality of channels relative to the third plurality of channels, the header including a second restricted flow region configured to decrease fluid flow to the inlet ends of the second plurality of channels relative to the third plurality of channels, and wherein the structure includes one or more cross passages configured to increase fluid flow to at least some of the first and second pluralities of channels at the first and second edge portions of the flow field relative to the third plurality of channels located between the first plurality of channels and the second plurality of channels, each of the one or more cross passages extending from a respective location at the inlet end of one of the third plurality of channels where the inlet end of the one of the third plurality of channels meets the header, and away from the header and toward one of the first plurality of channels or one of the second plurality of channels.

2. The fuel cell of claim 1, comprising an inlet manifold having a first width and the flow field having a second width greater than the first width, and inlets to the flow field arranged across the second width.

3. The fuel cell of claim 2 wherein the channels extend along a length from the header toward an exhaust header, and the channels are parallel with one another along the length.

4. The fuel cell of claim 1 wherein the cross passages are sized and arranged to contribute to an even flow distribution across the flow field.

5. A plate for a fuel cell, the plate comprising:
a flow field having a first plurality of channels at a first edge portion of the flow field, a second plurality of channels at a second edge portion of the flow field opposite to the first edge portion, and a third plurality of channels between the first plurality of channels and the second plurality of channels, each of the channels having an inlet end open to a header in fluid communication with each respective inlet end, the header including a first restricted flow region configured to decrease fluid flow to the inlet ends of the first plurality of channels relative to the third plurality of channels, the header including a second restricted flow region configured to decrease fluid flow to the inlet ends of the second plurality of channels relative to the third plurality of channels, and
wherein the flow field has one or more cross passages configured to increase fluid flow to at least some of the first and second pluralities of channels at the first and second edge portions of the flow field relative to the third plurality of channels located between the first plurality of channels and the second plurality of channels, each of the one or more cross passages extending from a respective location at the inlet end of one of the third plurality of channels where the inlet end of the one of the third plurality of channels meets the header, and away from the header and toward one of the first plurality of channels or one of the second plurality of channels.

6. A fuel cell plate comprising:
a first plurality of channels at a first edge portion of the fuel cell plate and a second plurality of channels at a central portion of the fuel cell plate, each of the channels having a respective inlet end open to and in fluid communication with a header, the header including a restricted flow region configured to decrease fluid flow through the header to the inlet ends of the first plurality of channels relative to inlet ends of the second plurality of channels; and
one or more cross passages configured to increase fluid flow to the first plurality of channels at the first edge portion of the fuel cell plate relative to the second plurality of channels at the central portion of the fuel cell plate, each of the one or more cross passages extending from a respective location at an inlet end of one of the second plurality of channels where the inlet end meets the header, and away from the header and toward one of the first plurality of channels.

7. The fuel cell plate of claim 6 wherein the fuel cell plate includes a third plurality of channels located at a second edge portion of the fuel cell plate opposite to the first edge portion, the header includes a second restricted flow region configured to decrease fluid flow through the header to inlet ends of the third plurality of channels relative to inlet ends of the second plurality of channels, and the fuel cell plate includes one or more second cross passages configured to increase fluid flow to the third plurality of channels at the second edge portion of the fuel cell plate relative to the second plurality of channels at the central portion of the fuel cell plate, each of the one or more second cross passages extending from a respective location at an inlet end of one of the second plurality of channels where the inlet end meets the header, and away from the header and toward one of the third plurality of channels.

8. The fuel cell of claim 1 wherein a first one of the one or more cross passages extends from a first one of the third plurality of channels across each of the first plurality of channels at the first edge portion of the flow field and a second one of the one or more cross passages extends from a second one of the third plurality of channels across each of the second plurality of channels at the second edge portion of the flow field.

9. The fuel cell of claim 8 wherein none of the cross passages extend from the first plurality of channels to the second plurality of channels.

10. The fuel cell of claim 1 wherein the one or more cross passages are perpendicular to the first, second, and third pluralities of channels.

11. The fuel cell of claim 1 wherein the one or more cross passages are isolated to opposing edge regions of the flow field, the opposing edge regions including the first and second edge portions of the flow field containing the first and second pluralities of channels, and the opposing edge regions including outer portions of a central portion of the flow field between the first and second edge portions which contains the third plurality of channels.

12. The fuel cell of claim 1 wherein an entirety of each of the one or more cross passages extends at an oblique angle away from a center of the flow field with increasing distance away from the header.

13. The fuel cell of claim 5 wherein a first one of the one or more cross passages extends from a first one of the third plurality of channels across each of the first plurality of channels at the first edge portion of the flow field and a second one of the one or more cross passages extends from a second one of the third plurality of channels across each of the second plurality of channels at the second edge portion of the flow field.

14. The fuel cell of claim 13 wherein none of the cross passages extend from the first plurality of channels to the second plurality of channels.

15. The fuel cell of claim 5 wherein the one or more cross passages are perpendicular to the first, second, and third pluralities of channels.

16. The fuel cell of claim 5 wherein the one or more cross passages are isolated to opposing edge regions of the flow field, the opposing edge regions including the first and second edge portions of the flow field containing the first and second pluralities of channels, and the opposing edge regions including outer portions of a central portion of the flow field between the first and second edge portions which contains the third plurality of channels.

17. The fuel cell of claim 5 wherein an entirety of each of the one or more cross passages extends at an oblique angle away from a center of the flow field with increasing distance away from the header.

18. The fuel cell plate of claim 6 wherein a first one of the one or more cross passages extends from a first one of the second plurality of channels at the central portion of the fuel cell plate across each of the first plurality of channels at the first edge portion of the fuel cell plate.

19. The fuel cell plate of claim 6 wherein the one or more cross passages are perpendicular to the first and second pluralities of channels.

20. The fuel cell plate of claim 6 wherein an entirety of each of the one or more cross passages extends at an oblique angle away from a center of the fuel cell plate with increasing distance away from the header.

21. The fuel cell plate of claim 7 wherein the one or more cross passages are isolated to opposing edge regions of the fuel cell plate, the opposing edge regions including the first and second edge portions of the fuel cell plate containing the first and third pluralities of channels, and the opposing edge regions including outer portions of a central portion of the fuel cell plate between the first and second edge portions which contains the second plurality of channels.

\* \* \* \* \*